(12) United States Patent
Ellis (10) Patent No.: US 11,861,995 B2
(45) Date of Patent: Jan. 2, 2024

(54) GATE-CONNECTOR SYSTEM FOR INTRUSION-DETECTION FENCING SYSTEM

(71) Applicant: Gavin Ellis, New Brocton, AL (US)

(72) Inventor: Gavin Ellis, New Brocton, AL (US)

( * ) Notice: Subject to any disclaimer, the term of this patent is extended or adjusted under 35 U.S.C. 154(b) by 374 days.

(21) Appl. No.: 17/393,696

(22) Filed: Aug. 4, 2021

(65) Prior Publication Data

US 2023/0037739 A1 Feb. 9, 2023

(51) Int. Cl.
*G08B 13/12* (2006.01)
*H02G 3/16* (2006.01)
*H02G 3/08* (2006.01)
*E04H 17/00* (2006.01)

(52) U.S. Cl.
CPC ......... *G08B 13/122* (2013.01); *E04H 17/017* (2021.01); *H02G 3/088* (2013.01); *H02G 3/16* (2013.01)

(58) Field of Classification Search
None
See application file for complete search history.

(56) References Cited

U.S. PATENT DOCUMENTS

| 4,097,025 A | 6/1978 | Dettmann et al. |
| 5,408,219 A | 4/1995 | Newman et al. |
| 9,183,713 B2 | 11/2015 | Doyle |

FOREIGN PATENT DOCUMENTS

| FR | 2936641 B1 | 3/2011 |
| KR | 10-1461520 B1 | 11/2014 |

*Primary Examiner* — Thomas S McCormack
(74) *Attorney, Agent, or Firm* — Bradley Arant Boult Cummings LLP (57) ABSTRACT

Devices, systems, and methods for intrusion-detection for use with a fence comprising a gate-section have been developed and are herein described. The present disclosure relates to and describes a gate-connector system for an intrusion-detecting-fence system. A intrusion-detecting cable is run from a fence to a gate section. On each side of the gate section, the cable is terminated into a junction-box and connected to a shorter cable-plug assembly that terminates in a weatherproof, pull-apart connector. The cable-plug assemblies from each side of the gate section are connected together to complete a circuit. With the intrusion-detecting cable extending onto the gate, intrusion-protection is provided on the gate section as well as on the fence. A gate at the gate section can easily be opened by unplugging the connectors.

22 Claims, 9 Drawing Sheets

GATE-CONNECTOR SYSTEM FOR
INTRUSION-DETECTION FENCING
SYSTEM

FIELD OF INVENTION

This disclosure relates generally to intrusion-detection systems, specifically intrusion-detection system for use with a fence.

BACKGROUND

Various systems are available to add intrusion-detection to an existing fence. A typical system includes a series of motion-detectors or other sensors connected by lengths of cable that are mounted to the fence. Signals are transmitted by the motion-detectors or similar sensor to a central unit that processes the signals to determine if there likely is an intrusion. For example, if a sensor in one area of the fence indicates motion but those around it do not, then that might indicate a person climbing the fence. If sensors along several section of fence indicate somewhat uniform swaying, then that might indicate that the movement is caused by the wind. For the system to be effective, the detection-cable should be applied to the entire length of the area enclosed by the fence. In other words, for an area surrounded by a fence, the detection-cable may form a loop or circuit.

Most fences that fence-in an area include a gate for ingress and egress of the fenced-in area. A cable, if extended across the gate, might interfere with the opening and/or the closing of the gate. Consequently, in a typical installation the cable is run through a trench in the ground under the gate. That could leave the gate without intrusion-detection. It also could add cost to the installation of the intrusion-detection system.

SUMMARY OF THE INVENTION

The present disclosure relates to and describes a gate-connector system for an intrusion-detecting-fence system. In some embodiments, a intrusion-detecting cable is run from a fence to a gate section. On each side of the gate section, the cable is terminated into a junction-box and connected to a shorter cable-plug assembly that terminates in a weather-proof, pull-apart connector. The cable-plug assemblies from each side of the gate section are connected together to complete a circuit from a control unit. With the intrusion-detecting cable extending onto the gate, intrusion-protection is provided on the gate section as well as on the fence. A gate at the gate section can easily be opened by unplugging the connectors. (Doing so may trigger an alert, which would ordinarily indicate intrusion, but which can be ignored during regular working hours.) Preferred embodiments of the invention therefore comprise an electrical-connection system, with a releasably securable weatherproof connector on one end and a terminal on the other end, for connecting an intrusion-detection cable across a gate in a fence, without trenching under the gate.

In a first embodiment, an intrusion-detection system, for use with a fence comprising a gate-section having a gate-gap having a first gap-side and a second gap-side, is provided and comprises: a intrusion-detecting cable adapted to be positioned substantially along the fence and having: a first cable end adapted to be positioned on the fence proximate the first gap-side, and a second cable end adapted to be positioned on the fence proximate the second gap-side; and a lead having a first lead end, a second lead end, and a removably couplable first lead connector, wherein the lead is a flexible electrical cable; wherein the first cable end and the first lead end are adapted to be coupled together, wherein the second cable end and the second lead end are adapted to be coupled together, and wherein the lead is configured to span the gate-gap when: the first cable end and the first lead end are coupled together; and the second cable end and the second lead end are coupled together; and the first lead connector is coupled.

In a second embodiment, an intrusion-detection system, for use with a fence comprising a gate-section having a gate-gap having a first gap-side and a second gap-side, is provided and comprises: a intrusion-detecting cable adapted to be positioned substantially along the fence and having: a first cable end adapted to be positioned on the fence proximate the first gap-side, and a second cable end adapted to be positioned on the fence proximate the second gap-side; and a lead having a first lead end, a second lead end, and a removably couplable first lead connector, and further comprises a first lead segment and a second lead segment, wherein the lead is a flexible electrical cable and wherein the first lead end is on the first lead portion and the second lead end is on the second lead portion; wherein the first cable end and the first lead end are adapted to be coupled together, wherein the second cable end and the second lead end are adapted to be coupled together, wherein the first lead connector is adapted to removable couple together the first lead segment and the second lead segment; and wherein the lead is configured to span the gate-gap when: the first cable end and the first lead end are coupled together; and the second cable end and the second lead end are coupled together; and the first lead connector is coupled.

In a third embodiment, an intrusion-detection system, for use with a fence comprising a gate-section having a gate-gap having a first gap-side and a second gap-side, is provided and comprises: a intrusion-detecting cable adapted to be positioned substantially along the fence and having: a first cable end adapted to be positioned on the fence proximate the first gap-side, and a second cable end adapted to be positioned on the fence proximate the second gap-side; and a lead having a first lead end, a second lead end, and a removably couplable first lead connector, and further comprises a first lead segment and a second lead segment, wherein the lead is a flexible electrical cable and wherein the first lead end is on the first lead portion and the second lead end is on the second lead portion; wherein the first cable end and the first lead end are adapted to be coupled together, wherein the second cable end and the second lead end are adapted to be coupled together, wherein the first lead connector is adapted to removable couple together the first lead segment and the second lead segment; and wherein the lead is configured to span the gate-gap when: the first cable end and the first lead end are coupled together; and the second cable end and the second lead end are coupled together; and the first lead connector is coupled; and further comprising an indicator coupled to the intrusion-detecting cable, wherein the indicator indicates that either: the first lead segment and the second lead segment are not coupled together; or the first cable end and the first lead end are not coupled together; or the second cable end and the second lead end are not coupled together.

In a fourth embodiment, a gate-spanning device, for use with an intrusion-detection system that has a intrusion-detecting cable that is for use with a fence comprising a gate-section having a gate-gap having a first gap-side and a second gap-side and a gap width, the intrusion-detecting cable comprising a first cable end adapted to be positioned on the fence proximate the first gap-side and a second cable end adapted to be positioned on the fence proximate the second gap-side, the gate-spanning device is provided and comprises: a lead, being a flexible electrical cable and comprising: a first lead end on a first lead segment; a second lead end on a second lead segment; and a first lead connector adapted to removably couple together the first lead segment and the second lead segment; wherein the first lead end is adapted to be coupled to the first cable end; wherein the second lead end is adapted to be coupled to the second cable end; wherein the lead is configured to span the gate-gap when: the first cable end and the first lead end are coupled together, and the second cable end and the second lead end are coupled together, and the lead connector is coupled; wherein the lead has a lead length; and wherein the lead-length is at least as large as than the gap width.

The above summary presents a simplified overview to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

The following drawings are attached to—and form a portion of—this disclosure.

DEFINITIONS

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. For brevity or clarity, well known functions or constructions may not be described in detail.

The terms "about" and "approximately" shall generally mean an acceptable degree of error or variation for the quantity measured in light of the nature or precision of the measurements. Typical, exemplary degrees of error or variation are within 20 percent (%), preferably within 10%, more preferably within 5%, of a given value or range of values. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a," "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

The terms "connected to," "coupled to," "coupled with," "in connection with," "in operative communication with," "in communication with," or "connecting" include any suitable connection, coupling, or communication, including mechanical connection, electrical connection (e.g., one or more wires), or signal-conducting channel (e.g., Bluetooth®, Near-Field Communication ("NFC"), or other inductive coupling or radio-frequency ("RF") link).

The term "processor" may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language ("HDL") software used for designing chips.

The term "signal" means any suitable signal, for example a voltage, a current, a duty cycle, a frequency or amplitude of electrical, electromagnetic, or optical oscillation, or a mechanical signal (e.g., pressure, vibration, a tap, or other mechanical signal) in some embodiments.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed; but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art.

The embodiments described are further intended to explain certain preferred modes of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

Devices, systems, and methods for intrusion-detection for use with a fence comprising a gate-section have been developed and are herein described.

Figure 1:
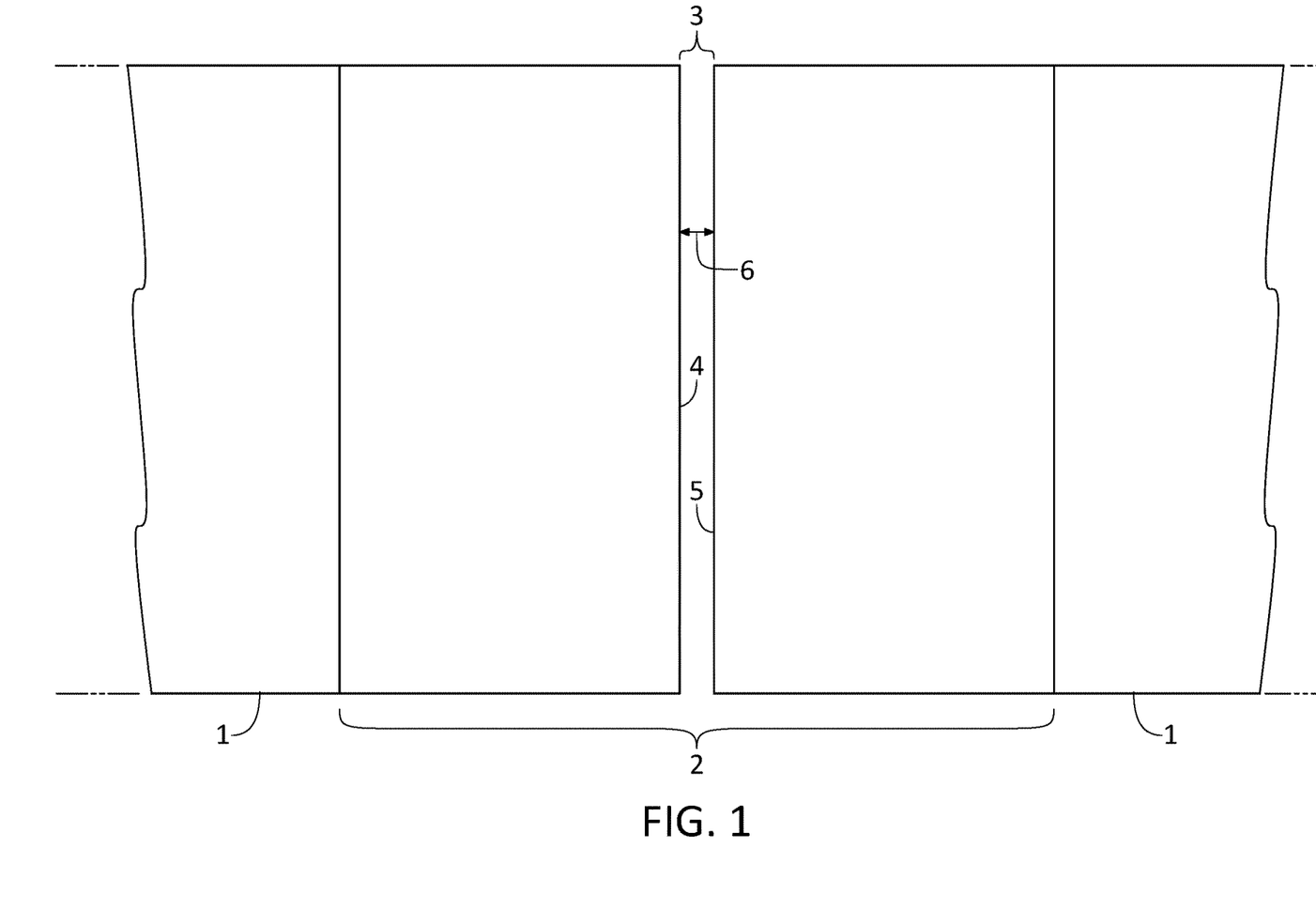
FIG. 1 is a schematic view of a portion of a fence.

FIG. 1 is a schematic view of a portion of a fence 1. The fence 1 may be any suitable fence—e.g., a chain-link fence, a wooden fence, a plastic fence, or any other suitable fence. The fence 1 comprises a gate-section 2 having a gate-gap 3. The gate-section 2 may include any suitable gate—e.g., a single-panel swinging gate, a double-panel swinging gate, a Hampshire gate, a portcullis, or a yett. The gate-gap 3 is a gap in the fence 1 at the gate-section 2. The gate-gap 3 may be any suitable gap. For example, if the gate-section 2 includes a single-panel swinging gate, then the gate-gap 3 is the gap in the fence 1 between the fencing and the panel of the single panel swinging gate. As another example, if the gate-section 2 includes a double-panel swinging gate, then the gate-gap 3 is the gap in the fence 1 between the two panels of the double-panel swinging gate. The gate-gap 3 has a first gap-side 4 and a second gap-side 5. When the gate is closed the first gap-side 4 and the second gap-side 5 are separated by a gap width 6. If the first gap-side 4 and the second gap-side 5 are separated by different distances at different heights of the fence, the gap width 6 is the smallest such separation distance. Typically, a gate-gap is small enough to prevent a person from squeezing through the fence, and large enough to allow the gate to be opened, closed, and latched. (FIG. 1, and the other figures herein, are not drawn to scale.) In some fences the gap width 6 might be approximately 4 inches. In some fences the gap width 6 might be between approximately 2 inches and approximately 6 inches. In some fences, when the gate is closed, the first gap-side 4 and the second gap-side 5 are in contact with each other—in such a fence the gap width 6 is zero. In some fences, when the gate is closed, the first gap-side 4 and the second gap-side 5 overlap—in such a fence the gap width 6 is negative, e.g. —6 inches.

Figure 2:
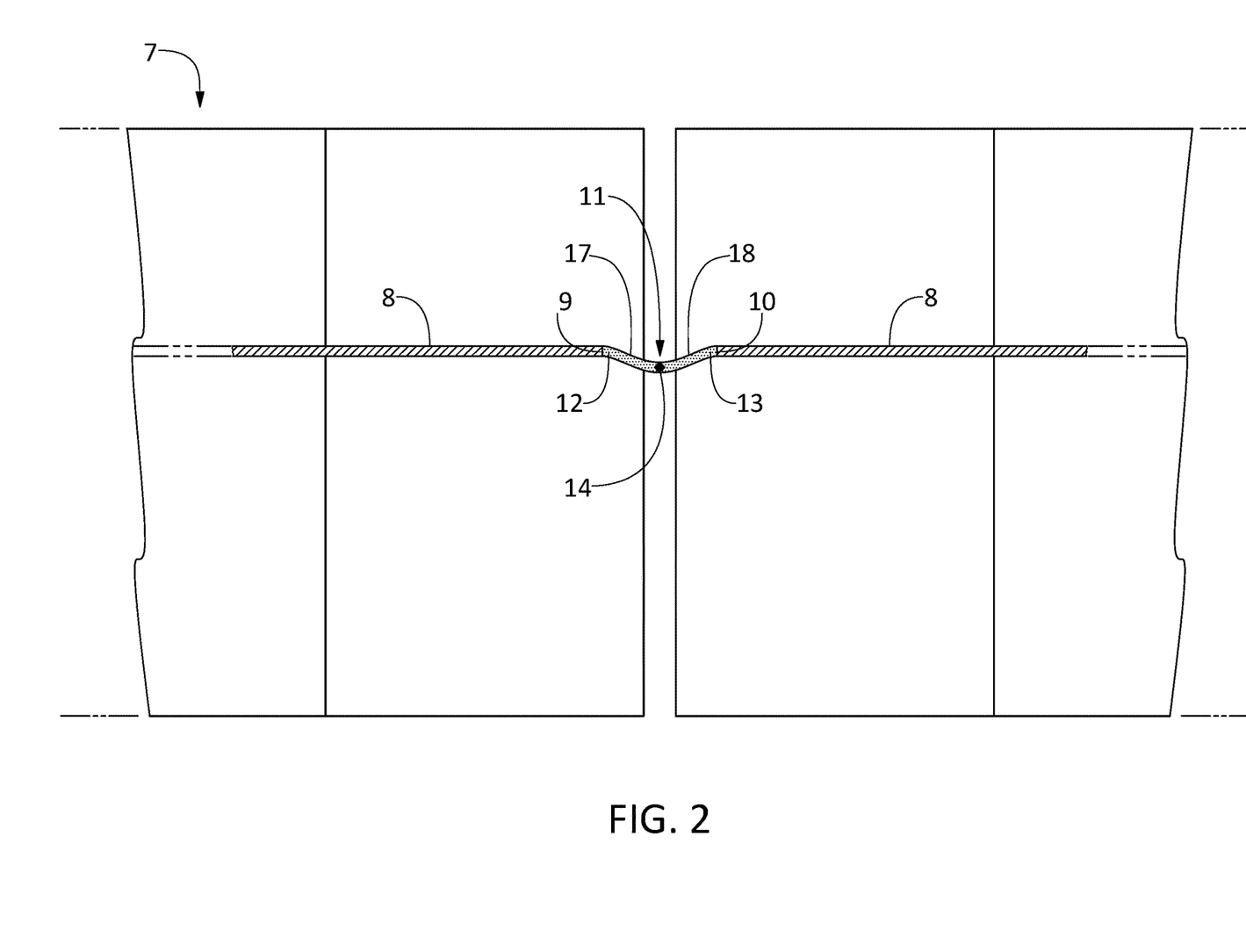
FIG. 2 is a schematic view of a portion of an intrusion-detection system used with a fence.

FIG. 2 is a schematic view of a portion of an embodiment of an intrusion-detection system 7 used with a fence 1.

The intrusion-detection system 7 comprises a intrusion-detecting cable 8. The intrusion-detecting cable 8 may be any suitable intrusion-detecting cable, e.g. the G-FENCE 600 shock-detection system available from SORHEA. The cable 8 may include any type of sensor known in the art for use in intrusion-detection systems, including for example vibration sensors, light-beam sensors, sound sensors, or any other such sensor. The intrusion-detecting cable 8 is adapted to be positioned substantially along the fence 1. For example, if the fence 1 is a chain-link fence, the intrusion-detecting cable 8 may be woven through or otherwise secured to the fence. The intrusion-detecting cable 8 may be attached to the fence 1 with cable ties or other attachment mechanism. The intrusion-detecting cable 8 has a first cable end 9 and a second cable end 10. The first cable end 9 is adapted to be positioned on the fence 1 proximate the first gap-side 4, e.g., on the fence 1 within about 6 to 12 inches from the first gap-side 4. The second cable end 10 is adapted to be positioned on the fence 1 proximate the second gap-side 5, e.g. on the fence 1 within about 6 to 12 inches from the second gap-side 5.

The intrusion-detection system 7 comprises a lead 11. The lead 11 is a flexible electrical connector, e.g. a cable or wire or insulated wire or any other suitable flexible electrical connector. The lead 11 has a first lead end 12, a second lead end 13, and a removably couplable first lead connector 14. The first lead end 12 and second lead end 13 may be any suitable electrical termination of the lead 11. The first lead connector 14 is a pull-apart connection system, e.g., a plug-and-socket connector. The first lead connector 14 may be weatherproof, e.g., sheathed with, wrapped with, or molded within a protective layer.

In this disclosure, the terms "weatherproof," "waterproof," "weather-resistant," or "water-resistant" describe a system or device on which rain, mist, condensation or other airborne moisture do not materially inhibit the intended operation or functionality of the system or device. For example the materials and design of the first lead connector 14 may be chosen to satisfy the requirements to receive an Ingress Protection code of at least IP21, at least IP21W, at least IP22, at least IP23, at least IP24, at least IP24W, at least IP31, at least IP31W, or at least IP34W. (Ingress Protection codes are defined in International Electrotechnical ("IEC") standard 60529, for example IEC 60529:1989+AMD1: 1999+AMD2:2013 CSV, including corrigenda at least through January 2019.)

Preferably, the pull-apart connector 14 can be disconnected freely without damage to the connector or the cable lead 11. Therefore, a straight pull-apart connector is preferred to a twist-lock or similar type connector that is configured to require a person to twist, depress or engage a securing mechanism, or otherwise manually manipulate the connector to properly decouple it. In some installations, for example, the gate or opening may need to accommodate a "crash-bar" or type emergency egress where the connector 14 will be forcibly disconnected without a person manually manipulating the connector. Likewise, in other instances, the gate may be motorized and operated remotely, and the gate motor may be actuated before a person has the opportunity to manually disconnect the first lead end 12 from the second lead end 13.

The first cable end 9 and the first lead end 12 are adapted to be coupled together. For examples, the first cable end 9 and the first lead end 12 may be spliced together, soldered together, crimped together, welded together, clamped together, or connected together via a connector. The second cable end 10 and the second lead end 13 are also adapted to be coupled together.

Figure 8:
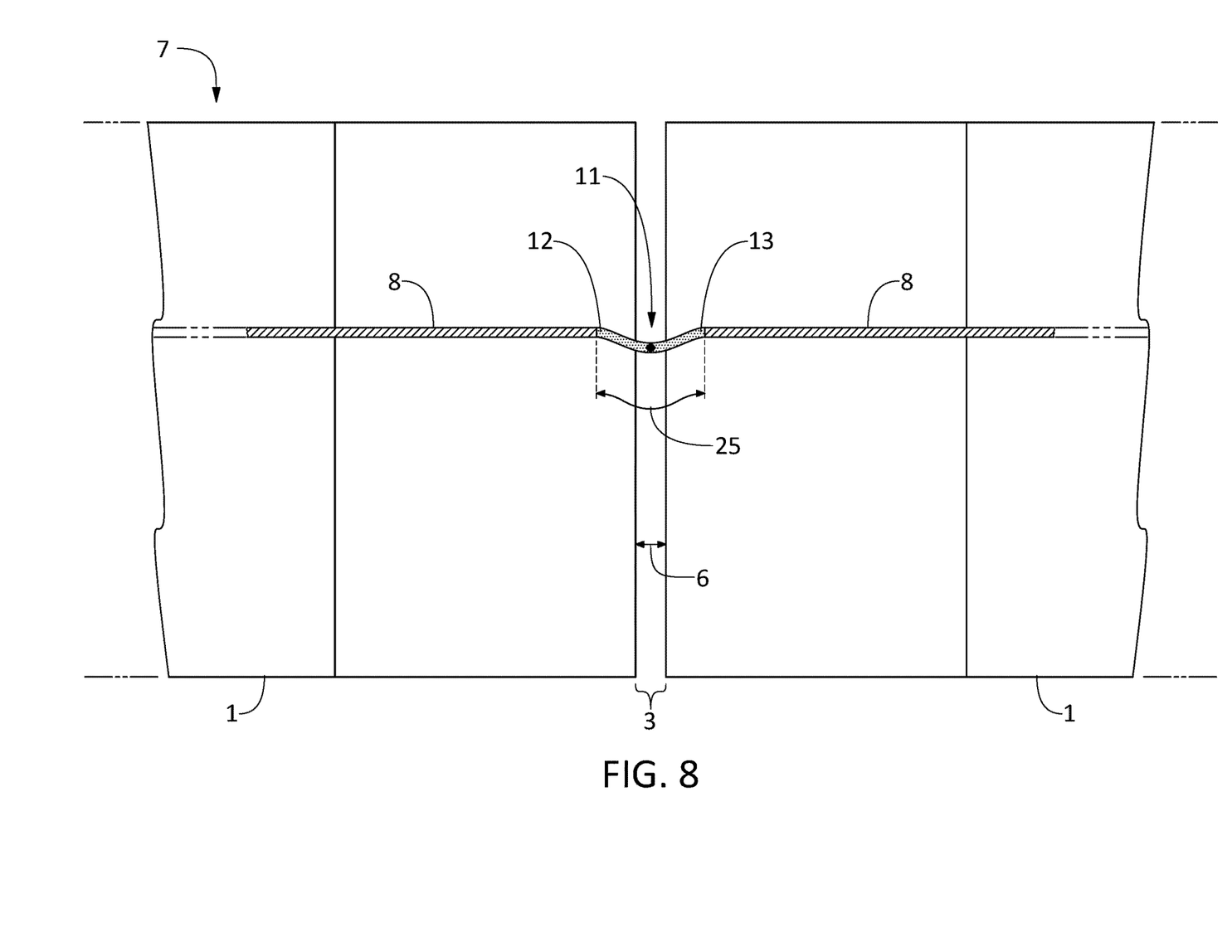
FIG. 8 is a schematic view of a portion of an intrusion-detection system used with a fence.

The lead 11 is configured to span the gate-gap 3 when: the first cable end 9 and the first lead end 12 are coupled together; and the second cable end 10 and the second lead end 13 are coupled together; and the first lead connector 14 is coupled. The couplings are strong enough to support the weight of the lead 1 against the forces of gravity and wind. In this sense, the lead 11—especially as adapted to be coupled to the intrusion-detecting cable 8, e.g. at first cable end 9 and at second cable end 10—is a gate-spanning device for use with an intrusion-detection system. The lead 11 preferably spans the gate-gap with some slack (as shown in FIG. 8).

The lead comprises a first lead segment 17 (or "first lead section") and a second lead segment 18 (or "second lead section"). The first lead end 12 is located on the first lead segment 17; the second lead end 13 is located on the second lead segment. 18. The first lead connector 14 removably couples together the first lead segment 17 and the second lead segment 18.

Figure 3:
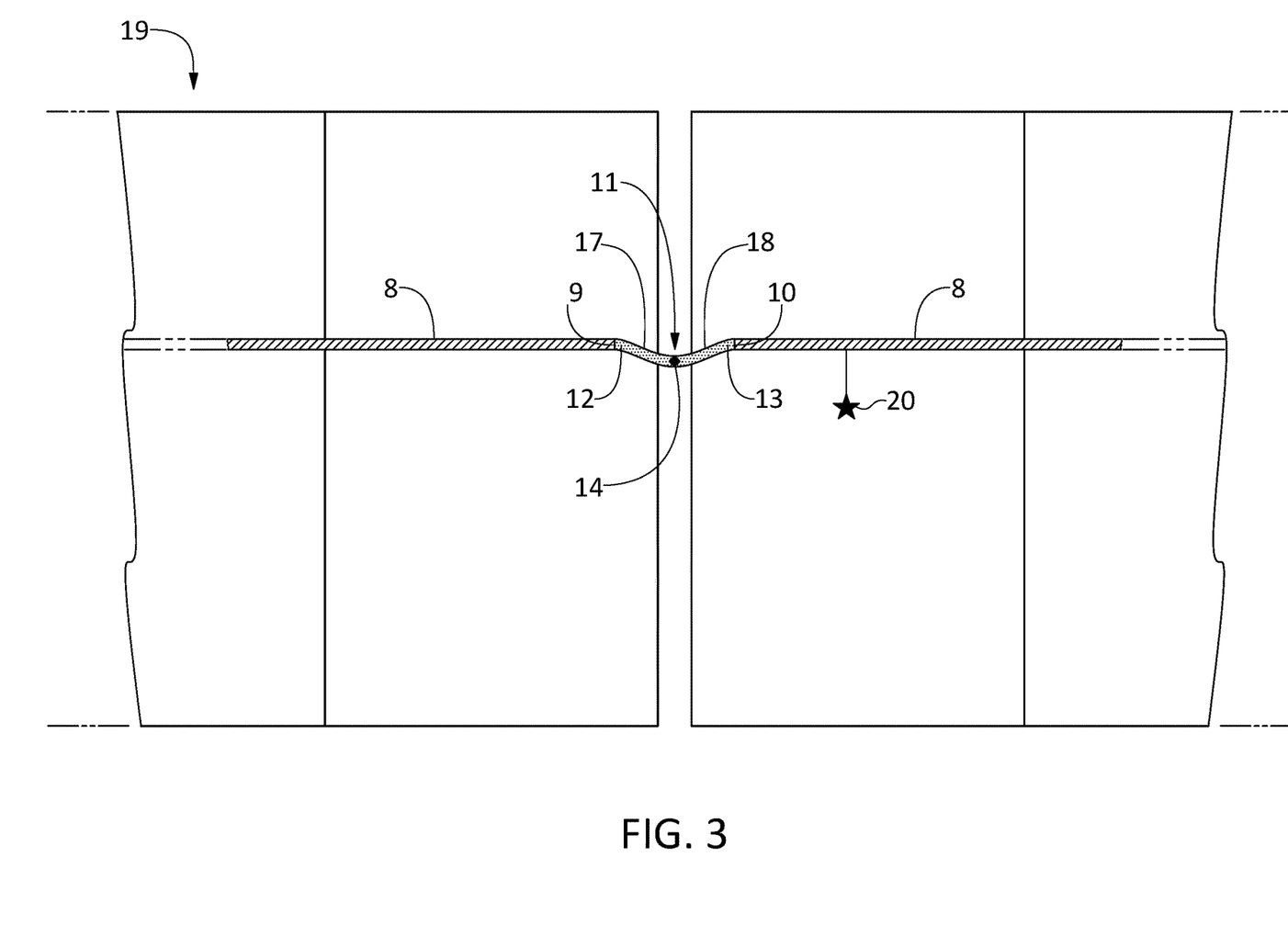
FIG. 3 is a schematic view of a portion of an intrusion-detection system used with a fence.

FIG. 3 is a schematic view of a portion of an embodiment of an intrusion-detection system 19 used with a fence 1.

The intrusion-detection system 19 comprises an indicator 20 coupled to the intrusion-detecting cable 8. The indicator 20 may be any suitable indicating device. The indicator 20 may be a light, e.g., a light-emitting diode. The indicator 20 may be an audio alarm, e.g. a horn, a klaxon, a buzzer, a bell, a whistle, or a siren. The indicator 20 may be physically near the fence 1. The indicator 20 may be physically remote from the fence 1, for example in a corporate office, a safety office, or an emergency-call-center. The indicator 20 may be a display device and may even be a mobile phone if suitable adapted to couple to the intrusion-detecting cable 8 to receive a signal.

The indicator 20 indicates that either: the first lead segment 17 and the second lead segment are not coupled together; or the first cable end 9 and the first lead end 12 are not coupled together; or the second cable end 10 and the second lead end 13 are not coupled together. The indicator 20 may also be adapted to indicate other states of the intrusion-detection system 19, of the intrusion-detecting cable 8, or of the lead 11—e.g., the movement of those components. The indicator 20 may be adapted to be reversibly disabled, so that the lead 11 may be decoupled from the intrusion-detecting cable without causing the indicator 20 to indicate such.

The intrusion-detection system 19 of FIG. 3 is otherwise similar to the intrusion-detection system 7 of FIG. 2.

Figure 4:
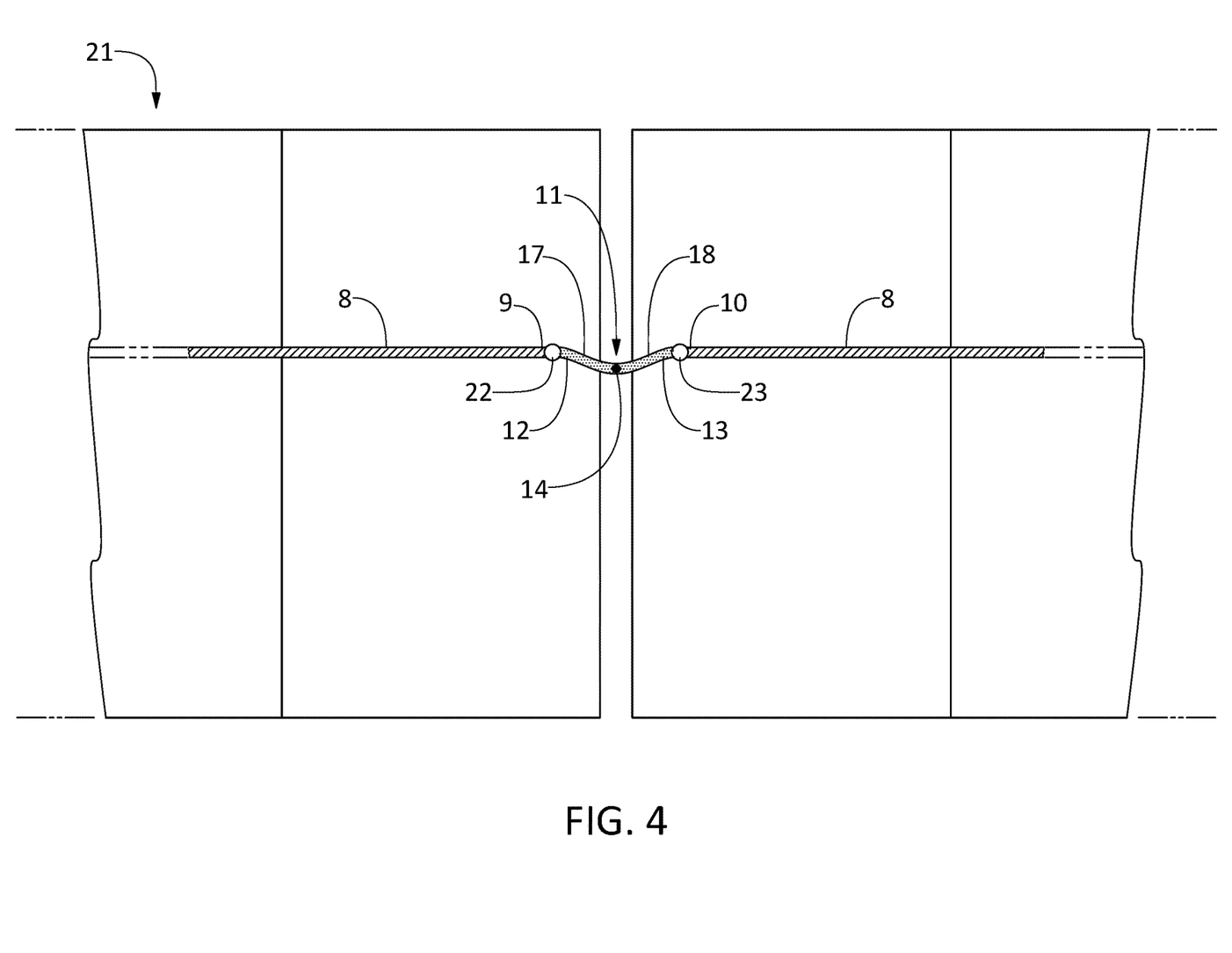
FIG. 4 is a schematic view of a portion of an intrusion-detection system used with a fence.

FIG. 4 is a schematic view of a portion of an embodiment of an intrusion-detection system 21 used with a fence 1. The intrusion-detection system 21 comprises: a first junction device 22 adapted to couple together a first cable end 9 and a first lead end 12; and a second junction device 23 adapted to couple together a second cable end 10 and a second lead end 12. The first junction device 22 and second junction device 23 may be any device suitable for electrically coupling wires or cables—including electrical tape, heat-shrink tubing, push-in wire connectors, Dupont connectors, quick-splice connectors, inline screw terminals, choc block connectors, spring terminal connectors, SCOTCHLOK connectors. twist-on connectors. In some embodiments, the first junction device 22 is a first electrical junction box and the second junction device 23 is a second electrical junction box. The intrusion-detection system 21 of FIG. 4 is otherwise similar to the intrusion-detection system 7 of FIG. 2.

Figure 5:
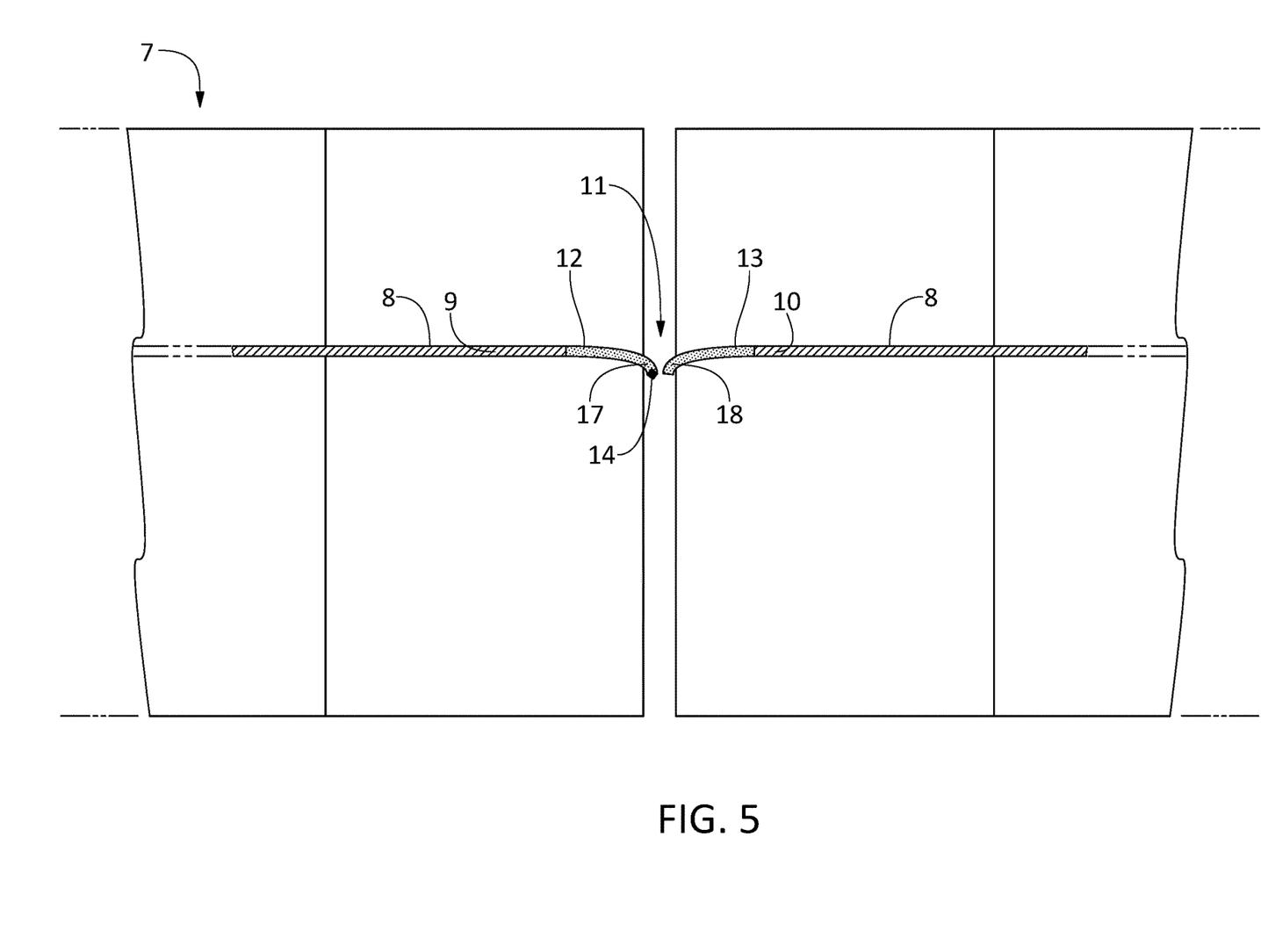
FIG. 5 is a schematic view of a portion of an intrusion-detection system used with a fence.

FIG. 5 is a schematic view of a portion of the intrusion-detection system 7 shown in FIG. 2 used with fence 1. FIG. 5 shows the intrusion-detection system 7 with the first lead connector 14 reversibly decoupled such that the first lead segment 17 and the second lead segment 18 are not coupled together. If the first lead connector 14 is a pull-apart connection system, then FIG. 5 schematically shows it having been pulled apart. If the first lead connector 14 is a plug-and-socket connector, then FIG. 5 schematically shows that the plug has been removed from the socket.

Figure 6:
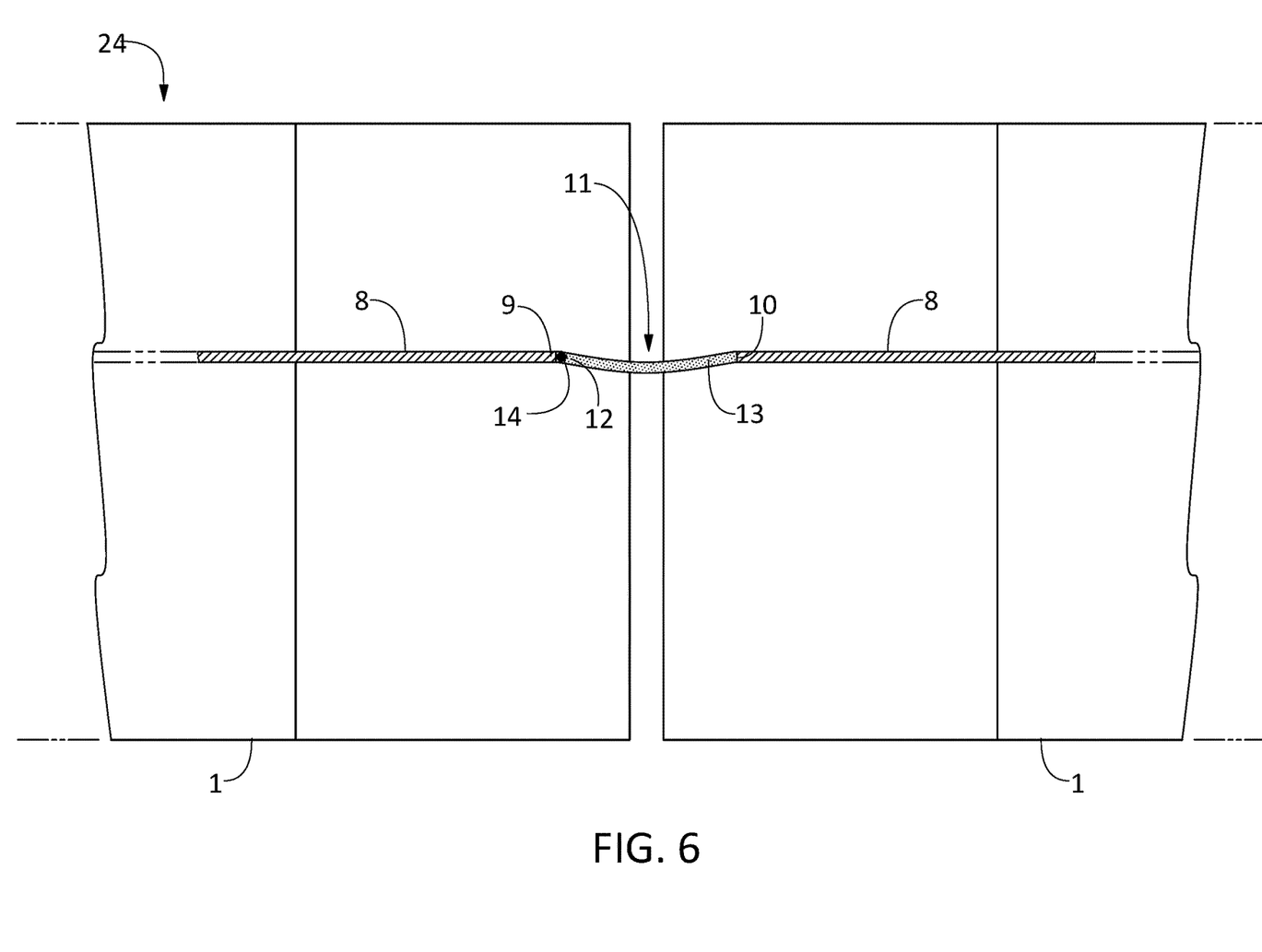
FIG. 6 is a schematic view of a portion of an intrusion-detection system used with a fence.

FIG. 6 is a schematic view of a portion of an embodiment of an intrusion-detection system 24 used with a fence 1. A first cable end 9 and a first lead end 12 are adapted to be removably coupled together by a first lead connector 14. The removable coupling may be of any suitable type, including the types of removable coupling that are disclosed in the descriptions herein of the other figures. In this embodiment, the second cable end 10 is configured to be coupled to the second lead end 13 via a coupling that is not adapted to be removable, and, in one embodiment, second cable end 10 comprises the second lead end 13. The intrusion-detection system 24 of FIG. 6 is otherwise similar to the intrusion-detection system 7 of FIG. 2.

Figure 7:
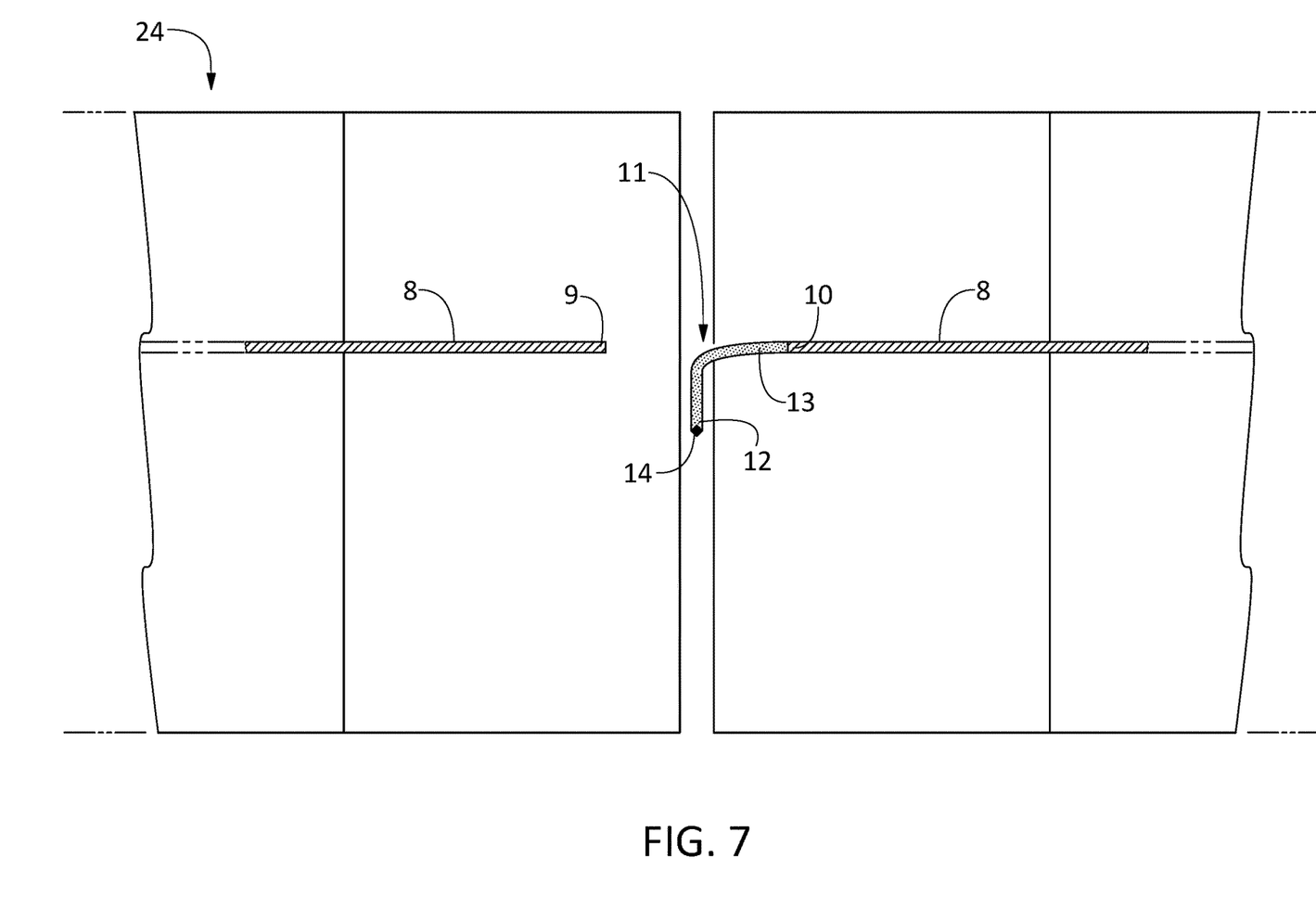
FIG. 7 is a schematic view of a portion of an intrusion-detection system used with a fence.

FIG. 7 is a schematic view of a portion of the intrusion-detection system 24 shown in FIG. 6 used with fence 1. FIG. 7 shows the intrusion-detection system 24 with the first lead connector 14 reversibly decoupled such that the first cable end 9 and the first lead end 12 are not coupled together. If the first lead connector 14 is a pull-apart connection system, then FIG. 7 schematically shows it having been pulled apart. If the first lead connector 14 is a plug-and-socket connector, then FIG. 5 schematically shows that the plug has been removed from the socket.

FIG. 8 is a schematic view of a portion of the intrusion-detection system 7 shown in FIG. 2 used with fence 1. FIG. 8 shows that the lead 11 has a lead length 25, i.e. a distance from the first lead end 12 to the second lead end 13 as measured along the lead 11. The lead length 25 is at least as large as the gap width 6. In some embodiments, the lead length 25 is between 1 and approximately 2 times the gap width 6. In some embodiments, the lead length 25 is between approximately 1.25 and 1.75 times the gap width. The lead length 25 may be selected to have enough slack to be conveniently and stably couplable to the intrusion-detecting cable 8 but not so much slack that wind can cause spurious motion of the lead 11.

Figure 9:
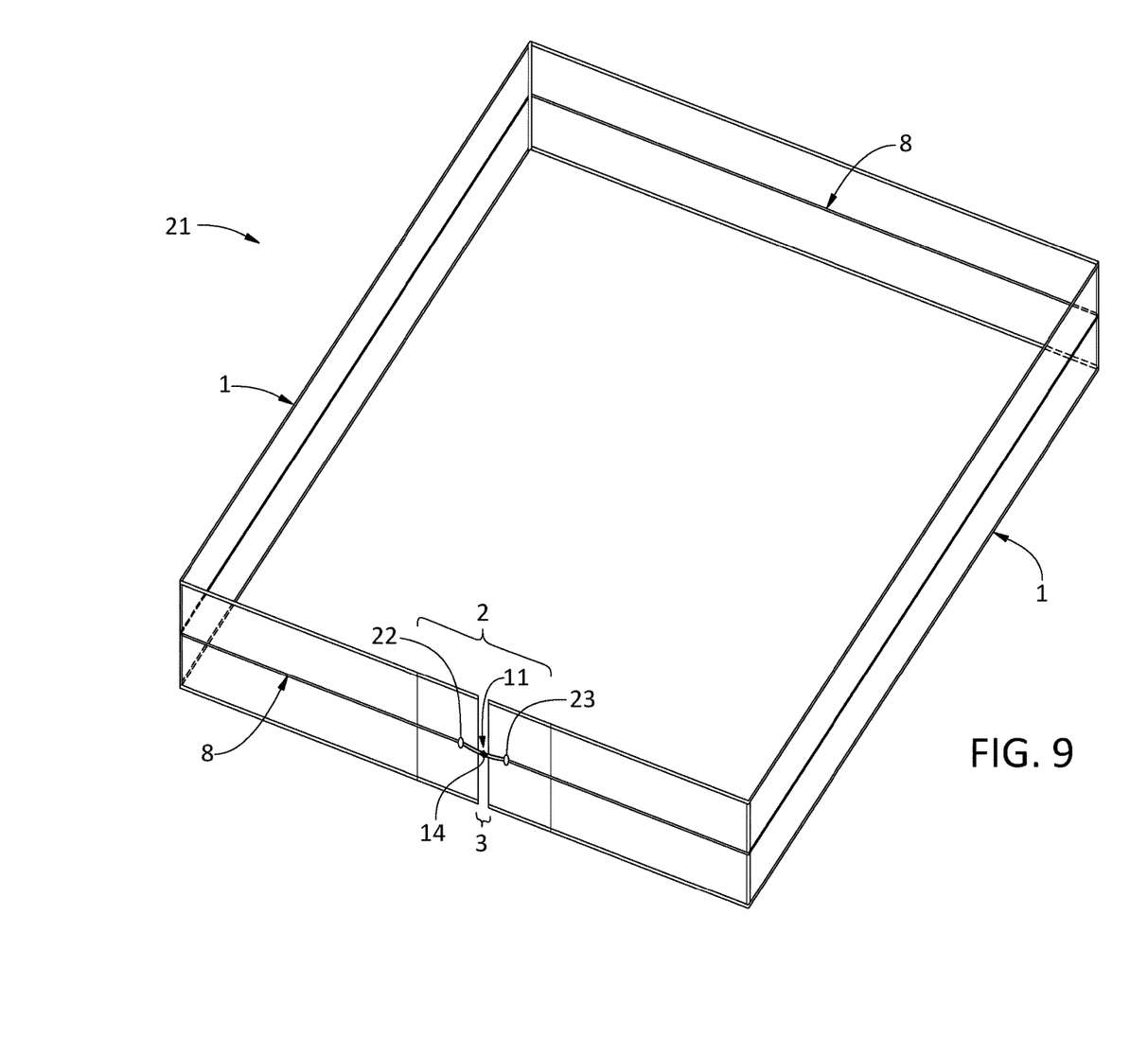
FIG. 9 is a perspective view of an intrusion-detection system used with a fence.

FIG. 9 is a perspective view of the intrusion-detection system 21 shown in FIG. 4 used with fence 1. The intrusion-detecting cable 8 and lead 11 are positioned along the fence and together form a complete circuit such that the intrusion-detecting cable 8 and lead 11 together enclose almost the same area as does the fence 1.

While the foregoing specification has described specific embodiments of this invention and many details have been put forth for the purpose of illustration or example, it will be apparent to one skilled in the art that the invention is susceptible to additional embodiments and that certain of the details described herein can be varied considerably without departing from the basic principles of the invention.

What is claimed is:

1. An intrusion-detection system, for use with a fence comprising a gate-section having a gate-gap having a first gap-side and a second gap-side, the intrusion-detection system comprising:
   a intrusion-detecting cable adapted to be positioned substantially along the fence and having:
      a first cable end adapted to be positioned on the fence proximate the first gap-side, and
      a second cable end adapted to be positioned on the fence proximate the second gap-side; and
   a lead having a first lead end, a second lead end, and a removably couplable first lead connector,
      wherein the lead is a flexible electrical cable;
   wherein the first cable end and the first lead end are adapted to be coupled together, wherein the second cable end and the second lead end are adapted to be coupled together, and wherein the lead is configured to span the gate-gap when:
the first cable end and the first lead end are coupled together; and
the second cable end and the second lead end are coupled together; and
the first lead connector is coupled.

2. The system of claim 1, wherein the removably couplable first lead connector is configured to be undamaged by forcible decoupling without manual manipulation.

3. The system of claim 1, the lead further comprising a first lead segment and a second lead segment;
wherein the first lead end is on the first lead segment,
wherein the second lead end is on the second lead segment, and
wherein the first lead connector is adapted to removably couple together the first lead segment and the second lead segment.

4. The system of claim 3, further comprising an indicator coupled to the intrusion-detecting cable, wherein the indicator indicates that either:
the first lead segment and the second lead segment are not coupled together; or
the first cable end and the first lead end are not coupled together; or
the second cable end and the second lead end are not coupled together.

5. The system of claim 3, wherein the first lead connector is a weatherproof, pull-apart connection system.

6. The system of claim 3, wherein the first lead connector is a plug-and-socket connector.

7. The system of claim 3, further comprising:
a first junction device adapted to couple together the first cable end and the first lead end; and
a second junction device adapted to couple together the second cable end and the second lead end.

8. The system of claim 7, wherein the first junction device is a first electrical junction box and the second junction device is a second electrical junction box.

9. The system of claim 1, wherein the first cable end and the first lead end are adapted to be removably coupled together by the first lead connector, and wherein the first lead connector is adapted to removably couple together the first cable end and the first lead end.

10. The system of claim 9, further comprising an indicator coupled to the intrusion-detecting cable, wherein the indicator indicates that either:
the first cable end and the first lead end are not coupled together; or
the second cable end and the second lead end are not coupled together.

11. The system of claim 9, wherein the first lead connector is a plug-and-socket connector.

12. The system of claim 9, wherein the first lead connector is a weatherproof, pull-apart connection system.

13. The system of claim 9, wherein the first lead connector is a first junction device.

14. The system of claim 13, wherein the first junction device is a first electrical junction box.

15. The system of claim 9, further comprising a first junction device adapted to couple together the second cable end and the second lead end.

16. The system of claim 15, wherein the first junction device is a first electrical junction box.

17. The system of claim 13, further comprising a second junction device adapted to couple together the second cable end and the second lead end.

18. The system of claim 17, wherein the second junction device is a first electrical junction box.

19. The system of claim 17, wherein the first junction device is a first electrical junction box and the second junction device is a second electrical junction box.

20. A gate-spanning device, for use with an intrusion-detection system that has a intrusion-detecting cable that is for use with a fence comprising a gate-section having a gate-gap having a first gap-side and a second gap-side and a gap width, the intrusion-detecting cable comprising a first cable end adapted to be positioned on the fence proximate the first gap-side and a second cable end adapted to be positioned on the fence proximate the second gap-side, the gate-spanning device comprising:
a lead, being a flexible electrical cable and comprising:
a first lead end on a first lead segment;
a second lead end on a second lead segment; and
a first lead connector adapted to removably couple together the first lead segment and the second lead segment;
wherein the first lead end is adapted to be coupled to the first cable end;
wherein the second lead end is adapted to be coupled to the second cable end;
wherein the lead is configured to span the gate-gap when:
the first cable end and the first lead end are coupled together, and
the second cable end and the second lead end are coupled together, and
the lead connector is coupled;
wherein the lead has a lead length; and
wherein the lead-length is at least as large as the gap width.

21. The device of claim 20, wherein the first lead connector is configured to be undamaged by forcible decoupling without manual manipulation.

22. The device of claim 20, wherein the lead length is between 1.25 and 1.75 times the gap width.

* * * * *